(12) United States Patent
Ji et al.

(10) Patent No.: US 10,382,993 B2
(45) Date of Patent: Aug. 13, 2019

(54) INTER-CELL INTERFERENCE MEASUREMENT METHOD AND DEVICE IN FLEXIBLE DUPLEX SYSTEM

(71) Applicants: Samsung Electronics Co., Ltd., Gyeonggi-do (KR); Yonsei University—Industry Foundation, Seoul (KR)

(72) Inventors: Hyoung-Ju Ji, Seoul (KR); Sang-Won Park, Seoul (KR); Youn-Sun Kim, Gyeonggi-do (KR); Chung-Yong Lee, Seoul (KR); Sang-Geun Lee, Seoul (KR)

(73) Assignees: Samsung Electronics Co., Ltd. (KR); Yonsei University—Industry Foundation (KR)

( * ) Notice: Subject to any disclaimer, the term of this patent is extended or adjusted under 35 U.S.C. 154(b) by 122 days.

(21) Appl. No.: 15/563,819

(22) PCT Filed: Mar. 29, 2016

(86) PCT No.: PCT/KR2016/003192
§ 371 (c)(1),
(2) Date: Jan. 30, 2018

(87) PCT Pub. No.: WO2016/159632
PCT Pub. Date: Oct. 6, 2016

(65) Prior Publication Data
US 2018/0184315 A1 Jun. 28, 2018

(30) Foreign Application Priority Data
Mar. 31, 2015 (KR) .......................... 10-2015-0045467

(51) Int. Cl.
*H04W 24/10* (2009.01)
*H04B 17/345* (2015.01)
(Continued)

(52) U.S. Cl.
CPC .......... *H04W 24/10* (2013.01); *H04B 17/345* (2015.01); *H04L 5/14* (2013.01);
(Continued)

(58) Field of Classification Search
CPC ..... H04L 43/08; H04L 43/0852; H04L 43/50; H04B 17/003; H04W 24/00
See application file for complete search history.

(56) References Cited

U.S. PATENT DOCUMENTS 7,996,035 B2   8/2011   Nguyen et al.
8,045,926 B2   10/2011  Martikkala et al.
(Continued)

FOREIGN PATENT DOCUMENTS

EP        2662987          11/2013
WO    WO 2014098407         6/2014
(Continued)

OTHER PUBLICATIONS

PCT/ISA/237 Written Opinion issued on PCT/KR2016/003192 (pp. 4).
(Continued)

*Primary Examiner* — Hassan A Phillips
*Assistant Examiner* — Prenell P Jones
(74) *Attorney, Agent, or Firm* — The Farrell Law Firm, P.C.

(57) ABSTRACT

The present disclosure relates to a 5G or pre-5G communication system that will be provided to support a higher data transmission rate beyond a 4G communication system such as LTE. Disclosed is an interference measurement method and device in a flexible duplex system. The method comprises the steps of: determining whether uplink (UL) grant for allocating UL transmission has been received from a base station in a first subframe; when the UL grant has not been received, measuring inter-cell interference for an uplink interference measurement resource (IMR) in at least one second subframe determined by the first subframe; and when the UL grant has been received, measuring inter-cell interference for the uplink interference measurement
(Continued)

resource (IMR) in at least one third subframe before a subframe that is indicated by the UL grant.

20 Claims, 12 Drawing Sheets

(51) Int. Cl.
    *H04L 5/14*           (2006.01)
    *H04W 72/04*         (2009.01)
    *H04W 72/06*         (2009.01)
    *H04W 72/08*         (2009.01)
    *H04W 72/14*         (2009.01)
    *H04B 7/26*           (2006.01)
    *H04W 88/02*         (2009.01)

(52) U.S. Cl.
    CPC ..... *H04W 72/044* (2013.01); *H04W 72/0413* (2013.01); *H04W 72/06* (2013.01); *H04W 72/082* (2013.01); *H04W 72/14* (2013.01); *H04B 7/26* (2013.01); *H04W 72/042* (2013.01); *H04W 88/02* (2013.01)

(56) References Cited

U.S. PATENT DOCUMENTS

| | | | |
|---|---|---|---|
| 8,275,424 B2 | 9/2012 | McCoy | |
| 2010/0003981 A1* | 1/2010 | Ahluwalia | H04W 36/02 455/436 |
| 2014/0341093 A1* | 11/2014 | Seo | H04W 52/143 370/280 |
| 2015/0181546 A1* | 6/2015 | Freda | H04W 56/0015 370/336 |
| 2015/0215825 A1* | 7/2015 | Kim | H04W 36/0088 370/331 |
| 2015/0365941 A1* | 12/2015 | Liu | H04Q 72/0446 370/280 |
| 2016/0105248 A1* | 4/2016 | Lunttila | H04B 17/345 370/252 |
| 2016/0119947 A1 | 4/2016 | Park et al. | |
| 2016/0227429 A1* | 8/2016 | Park | H04B 17/24 |
| 2016/0277983 A1* | 9/2016 | Kim | H04W 36/0088 |
| 2017/0238323 A1* | 8/2017 | Marinier | H04W 72/06 370/329 |

FOREIGN PATENT DOCUMENTS

| | | |
|---|---|---|
| WO | WO 2014181154 | 11/2014 |
| WO | WO 2015037885 | 3/2015 |

OTHER PUBLICATIONS

PCT/ISA/210 Search Report issued on PCT/KR2016/003192 (pp. 4).

3GPP TSG RAN Meeting #67, Shanghai, China Mar. 9-12, 2015, Further discussion on regulatory aspects related to flexible duplex operation for E-UTRAN, pp. 10.

* cited by examiner

INTER-CELL INTERFERENCE MEASUREMENT METHOD AND DEVICE IN FLEXIBLE DUPLEX SYSTEM

PRIORITY

This application is a National Phase Entry of International Application No. PCT/KR2016/003192, which was filed on Mar. 29, 2016, and claims priority to Korean Patent Application No. 10-2015-0045467 filed on Mar. 31, 2015, the content of each of which is incorporated herein by reference.

TECHNICAL FIELD

The present invention relates to a method and device for measuring inter-cell interference for improving a transmission rate in a flexible duplex system.

BACKGROUND ART

In order to meet wireless data traffic demand, which has increased since the commercialization of a 4th Generation (4G) communication system, efforts to develop an improved 5G communication system or a pre-5G communication system have been made. For this reason, the 5G communication system or the pre-5G communication system is referred to as a beyond-4G network (B4G) communication system or a post-Long-Term-Evolution (post-LTE) system.

In order to achieve a high data transmission rate, the implementation of the 5G communication system in an mmWave band (e.g., 60 GHz band) is being considered. In the 5G communication system, technologies such as beam-forming, massive Multi-Input Multi-Output (MIMO), Full-Dimensional MIMO (FD-MIMO), array antenna, analog beam-forming, and large scale antenna have been discussed to mitigate propagation path loss in the mmWave band and increase a propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and interference cancellation have been developed to improve the system network in the 5G communication system.

In addition, in the 5G system, there have been developed Advanced Coding Modulation (ACM) schemes, such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Also, in the B4G (Beyond 4G) and 5G systems, carrier aggregation (CA) and dynamic time division duplex (TDD) have been standardized. Dynamic TDD is a technology in which downlink (DL) bands and uplink (UL) bands are allocated in different proportions so as to solve the imbalance of DL/UL demand. CA technology is a technology that dramatically increases the amount of DL transmission by combining DL bands, which may be useful when the amount of DL traffic is expected to explosively increase compared to the amount of UL traffic demanded. Dynamic TDD and CA technology have the merit of effectively processing DL traffic. However, dynamic TDD may not be supported in a nation that is incapable of supporting TDD or by an operator who uses only FDD bands. Meanwhile, CA technology is capable of supporting FDD and TDD modes, but is incapable of supporting flexible DL/UL band allocation, which is a drawback.

A flexible duplex system is a technology that flexibly allocates DL and UL resources in an FDD mode and can overcome the drawbacks of both dynamic TDD and CA. Research on flexible duplex systems has been actively conducted. Flexible duplex systems are capable of satisfying the demand for DL traffic by borrowing a part of a UL band in which the amount of traffic demanded is relatively small and using the borrowed part as a DL band in an FDD mode. However, since a subframe in the UL band can be converted to a subframe in the DL band, UL and DL between respective pieces of user equipment (UEs) may be mismatched under the situation of multiple cells. Accordingly, interference between UEs, which is a new drawback, has occurred. Currently standardized technology for LTE-Advanced (LTE-A) includes technologies for effectively removing such interference, but does not have technology for measuring the interference. Accordingly, there is desire for a new interference measurement technology.

DETAILED DESCRIPTION OF THE INVENTION

Technical Problem

Therefore, the present invention has been made in view of the above-mentioned problems, and the present invention provides a method and device for measuring interference from UL transmission of a UE in a neighboring cell in a flexible duplex system.

The present invention provides a method and device for measuring inter-UE interference attributable to UL-DL mismatch between Node Bs.

The present invention provides a method and device for measuring interference and reporting, to a Node B, the interference measured by a UE in a flexible duplex system.

The present invention provides a method and device for satisfying the amount of DL traffic demanded by applying a flexible duplex system to LTE-A, thereby improving an overall transmission rate.

Technical Solution

In accordance with an aspect of the present invention, there is provided a method of measuring interference in a flexible duplex system, the method including: determining whether a UL grant for allocating uplink (UL) transmission is received from an evolved Node B (eNB) in a first subframe; when a UL grant is not received, measuring inter-cell interference with respect to an uplink interference measurement resource (IMR) in at least one second subframe determined by the first subframe; and when a UL grant is received, measuring inter-cell interference with respect to the uplink IMR in at least one third subframe prior to a subframe indicated by the UL grant.

In accordance with another aspect of the present invention, there is provided a method of supporting interference measurement by a user equipment in a flexible duplex system, the method including: transmitting, to a first UE which is to measure inter-cell interference, a first signal for requesting UL interference measurement and a second signal indicating a location of an uplink interference measurement resource of each subframe, during a first subframe; transmitting, to at least one second UE, which is different from the first UE, a UL grant for allocating uplink transmission and the second signal indicating the location of the uplink interference measurement resource, during the first subframe; receiving, from the first UE, channel quality information (CQI) and an uplink rank indicator (RI) which are based on inter-cell interference measured in the uplink interference measurement resource; and transmitting a downlink (DL) signal to the first UE according to the CQI and the RI in at least one predetermined subframe of an uplink band.

In accordance with an aspect of the present invention, there is provided a UE for measuring interference in a flexible duplex system, the UE including: a receiving unit configured to detect whether a UL grant for allocating UL transmission is received from an eNB in a first subframe; and a controller configured to measure inter-cell interference with respect to an uplink IMR in at least one second subframe determined by the first subframe when the UL grant is not received, and configured to measure inter-cell interference with respect to the uplink IMR in at least one third subframe prior to a subframe indicated by the UL grant when the UL grant is received.

In accordance with another aspect of the present invention, there is provided an eNB for supporting interference measurement by a user equipment in a flexible duplex system, the eNB including: a transmitting unit configured to transmit, to a first UE which is to measure inter-cell interference, a first signal for requesting UL interference measurement and a second signal indicating the location of an uplink interference measurement resource of each subframe, during a first subframe, and configured to transmit, to at least one second UE, which is different from the first UE, a UL grant for allocating uplink transmission and the second signal indicating the location of the uplink interference measurement resource, during the first subframe; a receiving unit configured to receive, from the first UE, CQI and an uplink RI which are based on inter-cell interference measured in the uplink interference measurement resource; and a controller configured to control the transmission of a DL signal for the first UE according to the CQI and the RI in at least one predetermined subframe of an uplink band.

BRIEF DESCRIPTION OF THE DRAWINGS

The above and other aspects, features, and advantages, according to specific exemplary embodiments of the present invention, will be more apparent from the following detailed description taken in conjunction with the accompanying drawings, in which.

It should be construed that like reference numerals are used for illustrating the same or similar elements, features, and structures throughout the above drawings.

MODE FOR CARRYING OUT THE INVENTION

Figure 1:
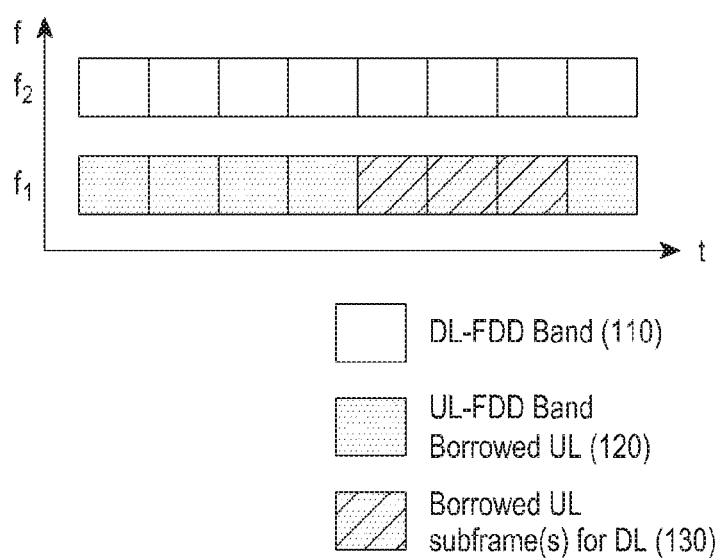
FIG. 1 is a diagram illustrating UL/DL resource allocation of a flexible duplex system according to an embodiment of the present invention.

Hereinafter, embodiments of the present invention will be described in detail with reference to the accompanying drawings.

In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present invention and ways to achieve them will be apparent by making reference to embodiments as described below in detail in conjunction with the accompanying drawings. However, the present invention is not limited to the embodiments set forth below, but may be implemented in various different forms. The following embodiments are provided only to completely disclose the present invention and inform those skilled in the art of the scope of the present invention, and the present invention is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "~ unit" as used in embodiments of the present invention means a software or hardware component, such as a field-programmable gate array (FPGA) or an application specific integrated circuit (ASIC), and the "~ unit" performs any functions. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Embodiments of the present invention will be described in detail, mainly from the perspective of an OFDM-based wireless communication system. However, the subject matter of the present specification may be applied to other communication systems and services having a similar technical background without departing from the scope of the present specification. Those skilled in the art will be able to determine whether the subject matter of the present specification is applicable.

In an LTE system, technologies such as an enhanced interference management and traffic adaptation (eIMTA) and CA are used for traffic adaptation. eIMTA is a technology for maximizing the traffic adaptation effect of TDD by performing TDD reconfiguration more flexibly than an existing TDD system. To this end, subjects, such as TDD reconfiguration, channel state information (CSI) feedback, and Hybrid Automatic Repeat Request-ACKnowledgement (HARQ-ACK) feedback timing have been discussed to date. CA is a technology for supporting a single UE by combining two or more frequency bands. CA may increase the traffic adaptation effect using an additional DL band for DL traffic adaptation or using FDD and TDD together (referred to as a TDD-FDD CA system).

FIG. 1 is a diagram illustrating UL/DL resource allocation of a flexible duplex system according to an embodiment of the present invention.

Referring to FIG. 1, the diagram 110 is a frequency band used for DL traffic transmission of an FDD mode, which is referred to as a DL-FDD band. The diagram 120 is a frequency band used for UL traffic transmission of the FDD mode, which is referred to as a UL-FDD band. The diagram 130 is an interval borrowed from the subframes of the UL-FDD band so as to use the borrowed interval for DL traffic. The borrowed interval is referred to as borrowed UL subframes. In the illustrated example, Fifth, sixth, and seventh subframes among the eight subframes included in a single frame of the UL-FDD band are borrowed to be used for DL.

As described above, this is a technology that performs DL traffic adaptation in an FDD system by using a part of the UL subframes for DL transmission. In this instance, the flexible duplex system borrows and uses a part of a UL band when the amount of DL traffic is significantly greater than the amount of UL traffic. Therefore, the flexible duplex system may have the merits of both an FDD system and a TDD system, and may be applicable to a CA system since the system is fundamentally based on FDD.

Figure 2:
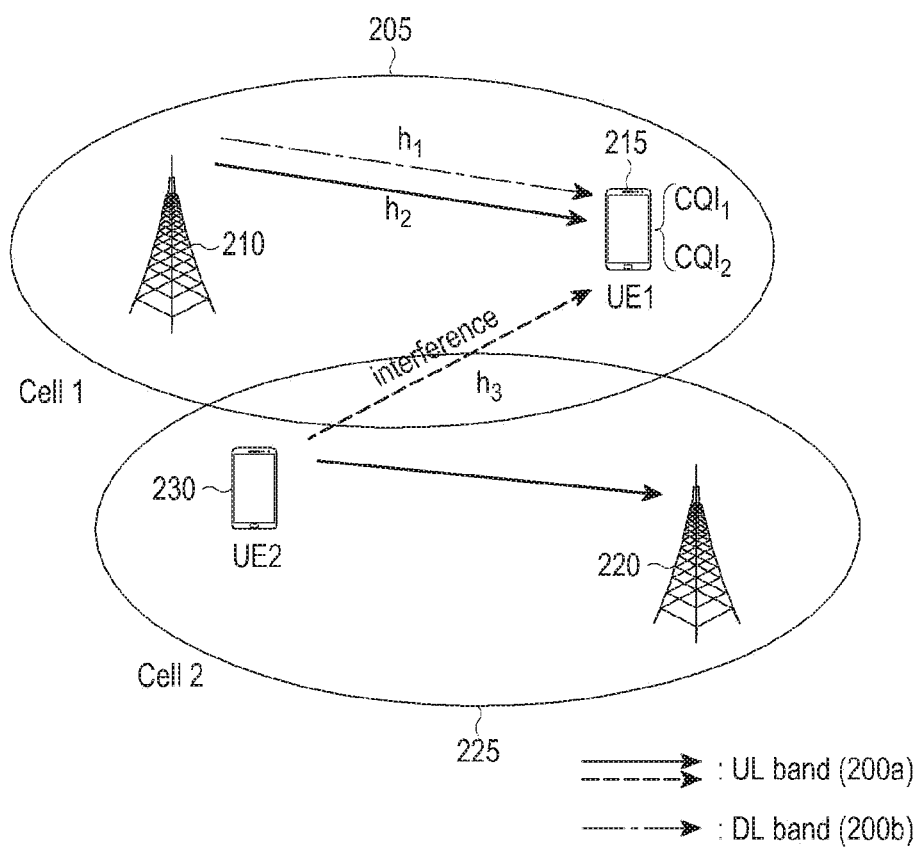
FIG. 2 is a diagram schematically illustrating a flexible duplex system in a multi-cell environment according to an embodiment of the present invention.

FIG. 2 is a diagram schematically illustrating a flexible duplex system in a multi-cell environment according to an embodiment of the present invention.

Referring to FIG. 2, cell 1 205 is controlled by eNB 1 210, and UE 1 215 exists in cell 1 205. Cell 2 225, which is close to cell 1 205 and may partially overlap cell 1 205, is controlled by eNB 2 220, and UE 2 230 exists in cell 2 225.

Cell 1 205 of eNB 1 210 and cell 2 225 of eNB 2 220 operate in the FDD mode, and operate a UL band 200a and a DL band 200b. Cell 1 205 borrows some subframes of the UL band 200a and uses the same for DL transmission. In the borrowed subframes, UE 1 215 may use a channel $h_1$ of the DL band 200b and a channel $h_2$ of the UL band 200a for DL reception. In this situation, when UE 2 225 in cell 2 225 performs UL transmission in the UL band 200b, a channel $h_3$ generated due to the UL transmission may interfere with UE 1 215.

UE 1 215 feeds back CSI to eNB 1 210 so that eNB 1 210 sets the modulation order, coding scheme, and the like that are to be applied to transmit DL data. The CSI includes Channel Quality Information (CQI), a Precoding Matrix Indicator (PMI), and a Rank Indicator (RI). UE 1 215 may measure a Signal-to-Interference-and-Noise Ratio (SINR) with respect to each band that allows reception, that is, the DL band 200b and the UL band 200a, and CQI for each band may be an index value obtained by quantizing an SINR. The CQI for each band may be Equation 1 and Equation 2 provided below.

$$CQI_1 = f\left(\frac{|w_1 h_1|^2}{N_0}\right) \quad \text{[Equation 1]}$$

$$CQI_2 = f\left(\frac{|w_2 h_2|^2}{\|h_3\|^2 + N_0}\right) \quad \text{[Equation 2]}$$

Here, $CQI_1$ denotes CQI of the DL band 200b, and $CQI_2$ denotes CQI of the UL band 200b borrowed for conversion to DL. f( ) denotes a quantization indication function based on SINR. When an RI and a PMI, which are given based on an input SINR, are applied, f( ) may output an indicator indicating an index value representing a modulation order and code rate which satisfy a 10% Block Error Rate (BLER). Also, $w_i$ denotes a pre-coder index applied to an $i^{th}$ channel (h1), and $N_0$ denotes power of noise.

Among CSI related to the channel $h_1$ of the DL band 200b, CQI is accurately measured through an allocated interference measurement resource (IMR), and a PMI and an RI may be determined through measurement of a CSI-reference signal (CSI-RS). The channel $h_2$ of the borrowed UL band 200a may be measured using a sounding reference signal (SRS). $h_3$ attributable to interference may not be measured directly by UE 1 215, and thus, UE 1 215 has difficulty in accurately recognizing $CQI_2$ of the channel $h_2$. Therefore, UE 1 215 may incorrectly measure CQI, as shown in Equation 3, rather than obtaining an accurate $CQI_2$.

$$CQI_2\left(f\left(\frac{|w_2 h_2|^2}{N_0}\right)\right) \qquad \text{[Equation 3]}$$

When the incorrectly measured CQI, as described above, is reported to eNB 1 210, eNB 1 210 may use the wrong modulation order and coding scheme to perform transmission to UE 1 215, whereby data transmission may not be smooth. Therefore, the flexible duplex system may need to accurately measure the effect of $h_3$.

A procedure and system structure therefor, which are used for measuring inter-UE interference attributable to inter-eNB UL-DL mismatch occurring in the flexible duplex system environment, and for reporting CSI, will be described as follows. Hereinafter, provided is an algorithm which accurately measures h3, which is uplink interference, and periodically or aperiodically reports the measured interference in the flexible duplex system.

Figure 3A:
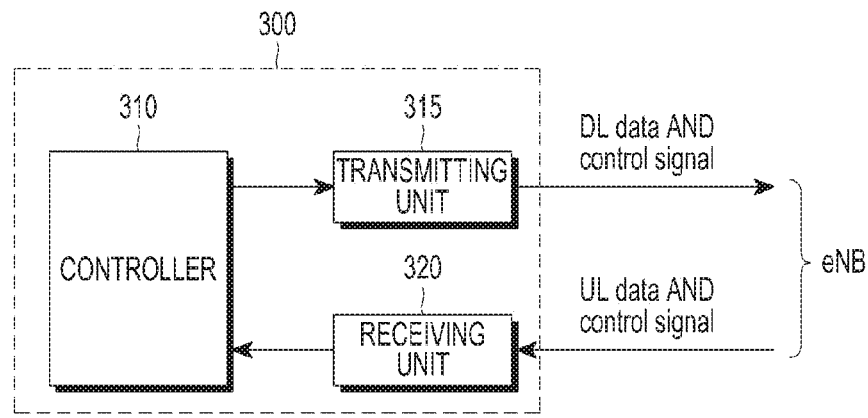
FIG. 3A is a block diagram illustrating the structure of a user equipment (UE) which is capable of borrowing a part of a UL band and using the same as a DL band in an FDD mode according to an embodiment of the present invention.

FIG. 3A is a block diagram illustrating the structure of a UE which is capable of borrowing a part of a UL band and using the same as a DL band in an FDD mode according to an embodiment of the present invention.

Referring to FIG. 3A, a UE 300 includes: a receiving unit 320 for receiving a UL grant, which is a resource allocation signal transmitted from an eNB, receiving signals indicating an uplink IMR and an uplink RI, and receiving a signal channel and an interference channel based on the received signals; a controller 310 for calculating estimated channel values of a signal channel and an interference channel; and a transmitting unit 315 for reporting CSI including information associated with a measured signal channel and an interference channel to an eNB.

Figure 3B:
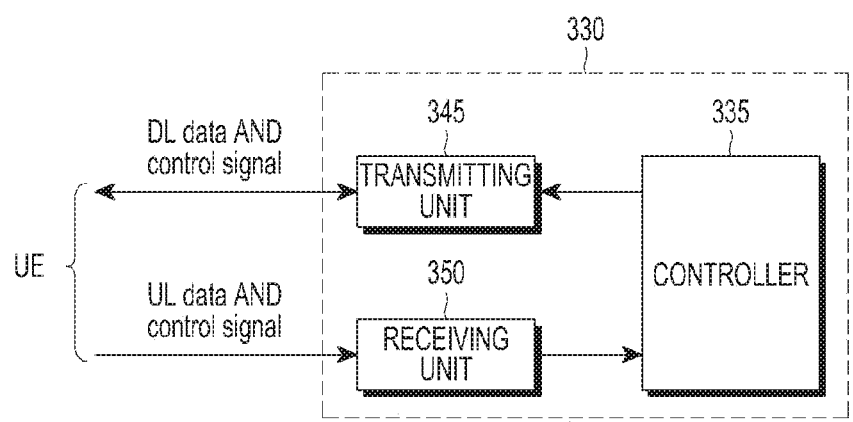
FIG. 3B is a block diagram illustrating the structure of an evolved Node B (eNB) which is capable of borrowing a part of a UL band and using the same as a DL band in an FDD mode according to an embodiment of the present invention.

FIG. 3B is a block diagram illustrating the structure of an eNB which is capable of borrowing a part of a UL band and using the same as a DL band in an FDD mode according to an embodiment of the present invention.

Referring to FIG. 3B, the eNB 330 includes: a transmitting unit 345 for transmitting, to a UE, a reference signal (RS) for channel measurement; a receiving unit 350 for receiving CSI reported by a UE; and a controller 340 for performing traffic adaptation with respect to a UE based on received CSI.

Figure 4A:
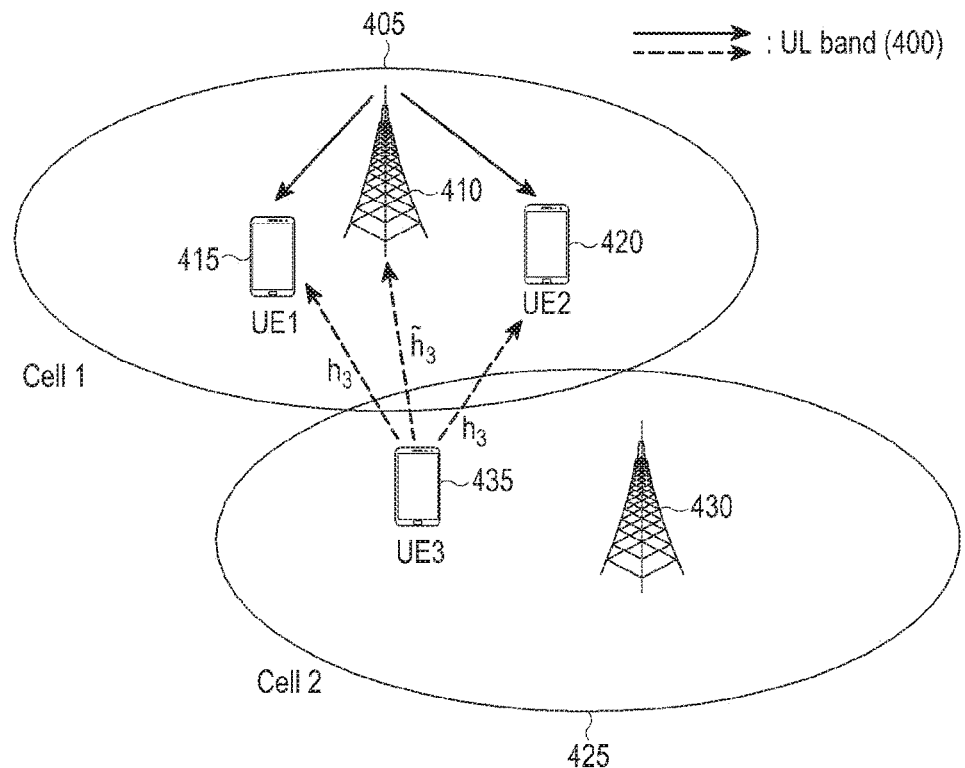
FIG. 4A is a diagram illustrating a scheme of indirectly measuring, by an eNB, the amount of uplink interference according to an embodiment of the present invention.

FIG. 4A is a diagram illustrating a scheme of indirectly measuring, by an eNB, the amount of uplink interference according to an embodiment of the present invention.

Referring to FIG. 4A, cell 1 405 is controlled by eNB 1 410, and UE 1 415 and UE 2 420 exist in cell 1 405. Cell 2 425, which is close to cell 1 405 and may partially overlap cell 1 405, is controlled by eNB 2 430, and UE 3 435 exists in cell 2 425.

UE 1 415 and UE 2 420 in cell 1 405 may receive a downlink signal from eNB 1 410 through a borrowed UL band 400. Also, UE 3 435 in cell 2 425 may transmit an uplink signal through the UL band 400, and the uplink signal may interfere with UE 1 415 and UE 2 420.

UE 3 435 may transmit an SRS using an SRS resource of the UL band 400. eNB 1 410 may directly measure $\|\tilde{h}_3\|^2$ attributable to the uplink interference caused by UE 3 430 and, due to the uplink interference, CQI of UE 1 415 and UE 2 420 may be estimated as shown in Equation 4.

$$CQI = f\left(\frac{|w_2 h_2|^2}{\|\tilde{h}_3\|^2 + N_0}\right) \qquad \text{[Equation 4]}$$

As an example, eNB 1 410 may provide information associated with the measured uplink interference to UE 1 415 and UE 2 420, and UE 1 415 and UE 2 420 may determine corrected CQI based on the provided information.

As another example, UE 1 415 and UE 2 420 may report, to eNB 1 410, CQI measured by excluding uplink interference attributable to UE 3 435, and eNB 1 410 may correct the CQI reported by the UEs 415 and 420 based on the uplink interference that is measured by eNB 1 410 itself.

As described above, when uplink interference is measured directly by an eNB itself, there is the merit of obtaining a CQI in which the amount of interference is corrected. However, referring to the example of FIG. 4A, when the distance between UE 1 415 and eNB 1 410 is short, interference indirectly measured by eNB 1 410 may be almost the same as the actual interference affecting UE 1 415. Conversely, like the case of UE 2 420, when the distance to eNB 1 410 is long, interference estimated by eNB 1 410 may be significantly different from the actual interference affecting UE 2 420.

Figure 4B:
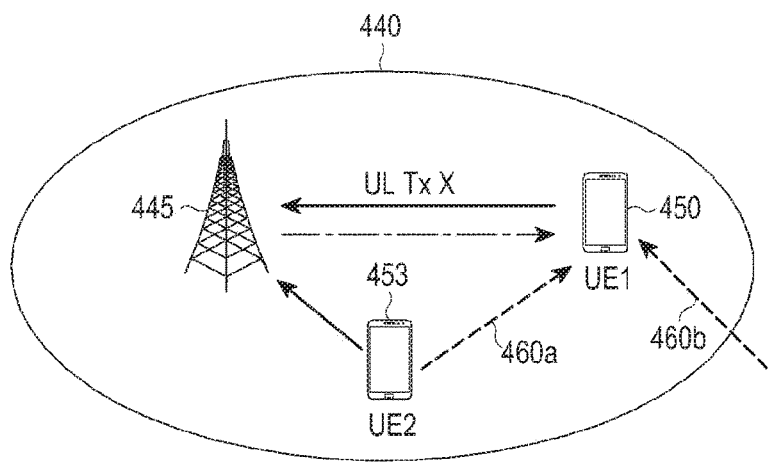
FIG. 4B is a diagram illustrating a scheme of directly measuring, by a UE, uplink interference according to an embodiment of the present invention.

FIG. 4B is a diagram illustrating a scheme of directly, measuring, by a UE, uplink interference according to an embodiment of the present invention.

Referring to FIG. 4B, a cell 440 is controlled by an eNB 445, and UE 1 450 and UE 2 455 exist in the cell 440. UE 1 450 may receive intra-cell interference 460a from UE 2 455 in the cell 440, or may receive inter-cell interference 460b from a UE (not illustrated) in a neighboring cell.

UE 1 450 uses an uplink IMR in order to measure uplink interference by itself. The uplink IMR may be defined as the time interval in which UL transmission is not performed through a UL band. By using the above described uplink IMR, UE 1 450 may be capable of measuring interference with respect to all signals excluding its own signal power. Herein, this requires attention to be paid to the fact that only inter-cell interference, excluding intra-cell interference, needs to be measured. The reason is that intra-cell UL transmission is not performed at the point in time at which flexible DL transmission is performed. Hereinafter, schemes of measuring inter-cell interference excluding intra-cell interference by using an uplink IMR will be described.

Hereinafter, an example will be described in which a UE performs UL transmission in a fourth subframe (offset=4) after a UL grant is received. In this instance, it is apparent that other values (e.g., 1 to 8) may be used as an offset for the UL grant, instead of 4. Concrete operations performed depending on whether a UL grant is allocated or not will be as follows.

1) when a UL grant is allocated in an N−4$^{th}$ subframe, a UE performs UL transmission in an N$^{th}$ subframe, and does not measure interference. Because the operation is to secure backward compatibility, the UE does not measure inter-cell interference in the N$^{th}$ subframe, and CQI may be estimated as shown in Equation 3.

2) when a UL grant is not allocated in an N−4$^{th}$ subframe, the UE does not perform UL transmission in the N$^{th}$ subframe, and may measure interference during a time interval starting from the N$^{th}$ subframe. That is, the UE operates in an interference reception mode when a signal from the outside exists in the N$^{th}$ subframe, where UL transmission is not allocated, whereby the UE regards the signal from the outside as interference and measures the amount of the interference.

Figure 5:
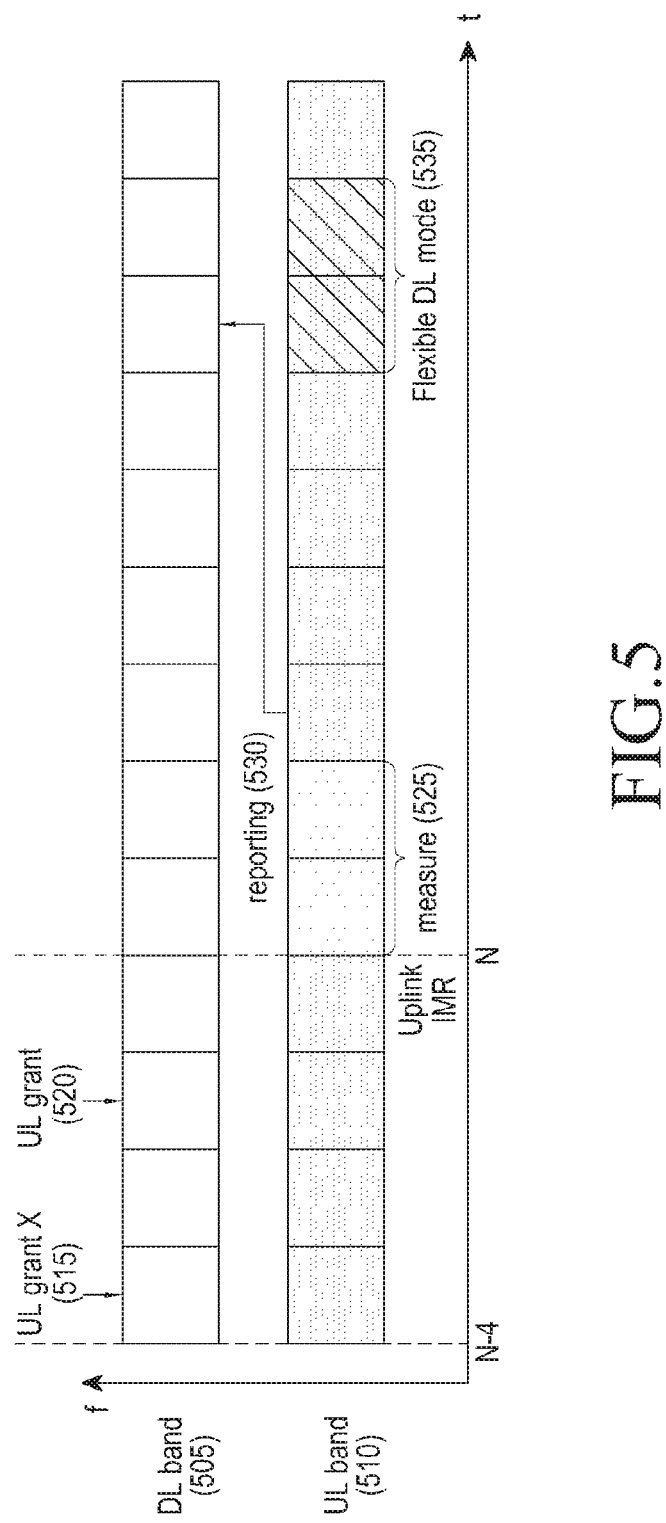
FIG. 5 is a diagram illustrating interference measurement when a UL grant is not allocated according to an embodiment of the present invention.

FIG. 5 is a diagram illustrating interference measurement when a UL grant is not allocated according to an embodiment of the present invention.

Referring to FIG. 5, an eNB operates a DL band 505 and a UL band 510 in an FDD mode, and a few subframes 535 of the UL band 510 may be borrowed and used for DL transmission. An operation mode in which the subframes 535 are used is referred to as a DL mode.

When a UL grant is not received in an N−4$^{th}$ subframe 515, a time interval 525 starting from an N$^{th}$ subframe may be an uplink IMR. The UE may regard the time interval 525 as an uplink IMR, and may measure interference by operating an interference reception mode during the time interval. The uplink IMR may be determined to be subframes prior to a subframe in which a UL grant is received. In the given example, a UL grant is received in an N−2$^{th}$ subframe 520, and thus, the UE may measure interference until reaching the N+2$^{th}$ subframe, which is allocated for UL transmission by the UL grant, that is, during the N$^{th}$ and N+1$^{th}$ subframes. After the uplink IMR ends, the interference measured during the time interval 525 may be reported 530 to the eNB in the N+2$^{th}$ subframe allocated by the UL grant. The eNB may perform DL transmission in the borrowed subframes 525 of the UL band based on the reported information associated with the interference.

3) when an eNB determines the allocation of a UL grant in an N−4$^{th}$ subframe, the eNB delays UL grant transmission during a single subframe or a few subframes and requests the UE to measure uplink interference. In this instance, UL transmission by the UE is delayed, but there is the merit in that interference measurement by the UE is always possible.

That is, in the N−4$^{th}$ subframe, the eNB transmits an uplink interference measurement request (UIMQ) signal to the UE instead of transmitting a UL grant, and the UE may measure interference in response to the reception of the UIMQ signal.

Figure 6:
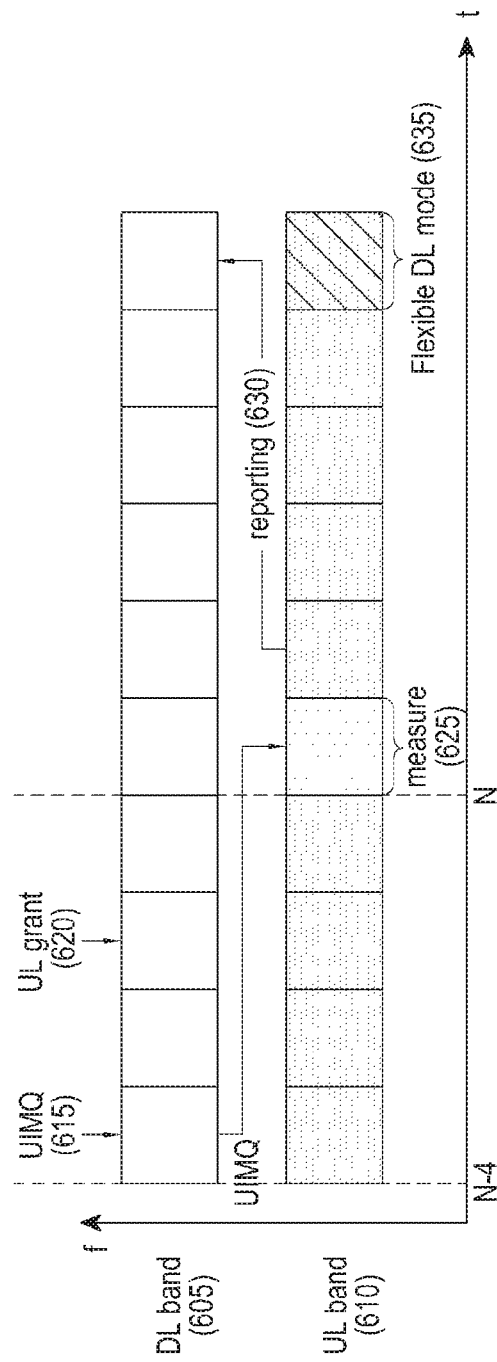
FIG. 6 is a diagram illustrating an operation of delaying transmission of a UL grant and measuring interference according to an embodiment of the present invention.

FIG. 6 is a diagram illustrating an operation of delaying transmission of a UL grant and measuring interference according to an embodiment of the present invention.

Referring to FIG. 6, an eNB operates a DL band 605 and a UL band 610 in an FDD mode, and a few subframes 635 of the UL band 610 may be borrowed for DL transmission. In the subframes 635, a UE may operate in a flexible DL mode.

In the case in which the transmission of a UL grant in an N−4$^{th}$ subframe 615 is determined, the eNB delays UL grant transmission to an N−3$^{th}$ subframe 620 and transmits UIMQ in the N−4$^{th}$ subframe 615, whereby a UE operates in an interference reception mode during the N$^{th}$ subframe 625. The UE measures interference during the N$^{th}$ subframe 615 and provides, to the eNB, a report 630 on information associated with the measured interference in an N+1$^{th}$ subframe allocated by the UL grant. The eNB may perform DL transmission in the borrowed subframes 635 of the UL band based on the reported information associated with the interference.

The embodiment of FIG. 6 allows periodic interference reporting. The period of an interference report is set to, for example, 10 ms, 20 ms, 40 ms, or the like. Referring to the example of FIG. 6, when the period of the interference report is set to 10 ms, the following operations may be performed.

i) determine to measure interference in an N$^{th}$ UL subframe ii) delay a UL grant, which is determined to be transmitted in an N−4$^{th}$ DL subframe, to an N−3$^{th}$ DL subframe iii) transmit UIMQ in the N−4$^{th}$ DL subframe iv) transmit the UL grant in the N−3$^{th}$ DL subframe v) report information associated with interference measured in an N$^{th}$ UL subframe to an eNB in an N+1$^{th}$ UL subframe vi) apply the information associated with the interference, to DL transmission in an N+5$^{th}$ DL subframe. Subsequently, transmission of a flexible DL mode is performed As described above, the uplink IMR indicates subframes which are vacated to be used for measuring interference (i.e., subframes in which UL transmission is restricted). Through use of the uplink IMR, a UE may measure inter-cell interference, avoiding intra-cell interference.

The first principle of the configuration of an uplink IMR is that the uplink IMR needs to be configured in a physical uplink shared channel (PUSCH) area that is vacated in both a UL subframe and a DL subframe. Generally, transmission power of a control area and a shared area are used differently, and thus interference may not be accurately measured in a physical uplink control channel (PUCCH) area. Therefore, the uplink IMR needs to be configured in a shared area where a PUSCH is allocated. Also, in a flexible DL mode, a time interval of a UL band is used for DL transmission. Accordingly, to measure interference in a part corresponding to a shared area of the time interval, the uplink IMR needs to be configured in an area that is vacated in both a UL subframe and a DL subframe.

The second principle of the configuration of the uplink IMR is that uplink IMR areas need to be configured to be the same with respect to UEs in a cell. If it is assumed that UE 1 needs to measure inter-cell interference and UE 2 interferes with UE 1, which is intra-cell interference, UE 2 is required to avoid performing UL transmission in the uplink IMR area and the UE 1 measures inter-cell interference in the same uplink IMR area. Information associated with the uplink IMR area may be reported from an eNB to UEs in a cell through an uplink IMR location (UIL) signal. When a UL grant and a UIL are received together, a UE interrupts (mutes) UL transmission in an area designated by the UIL. When UIMQ and UIL signals are received together, the UE may measure interference in an area (i.e., the uplink IMR) designated by the UIL.

Figure 7:
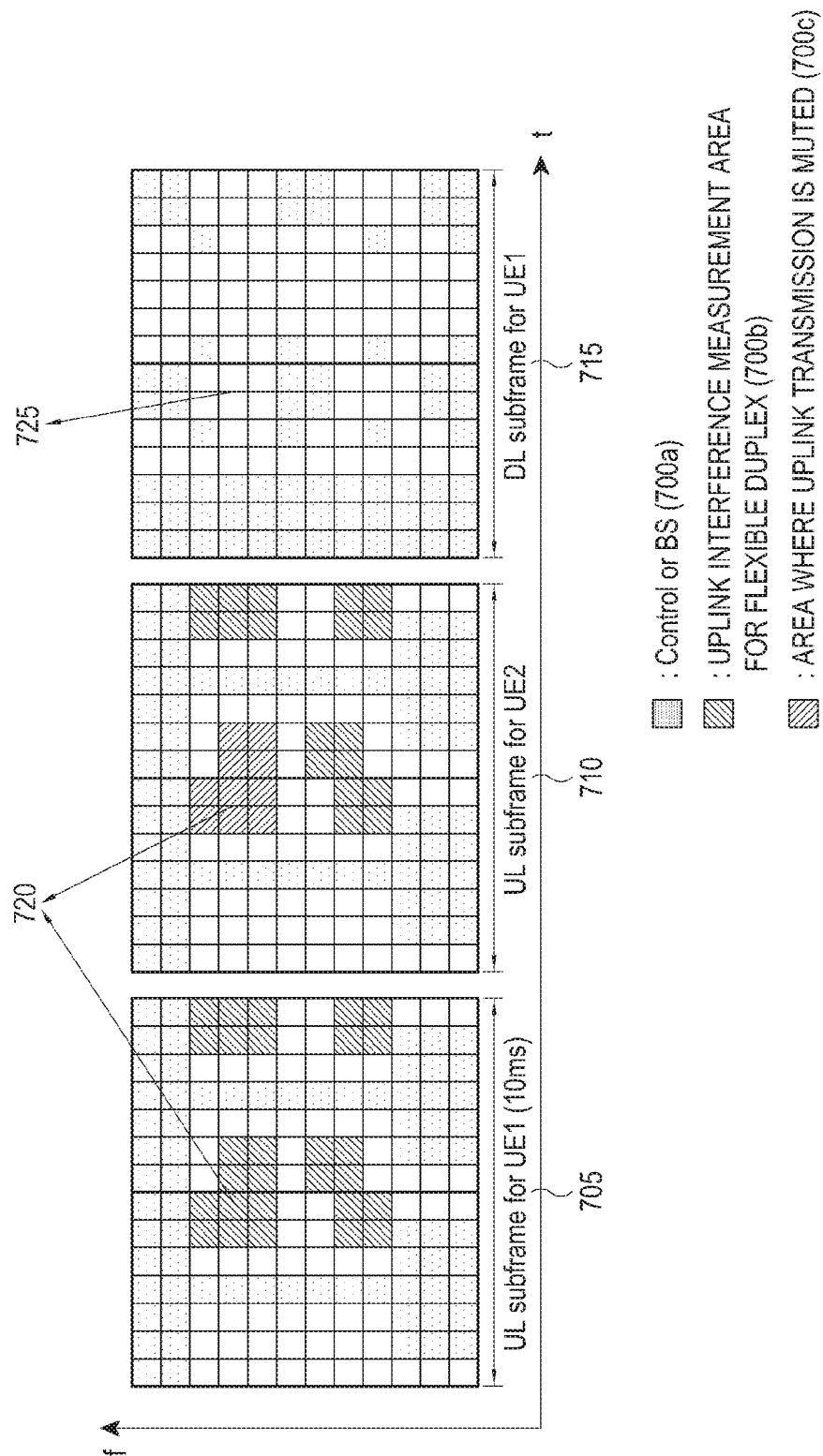
FIG. 7 is a diagram illustrating an example of the configuration of uplink IMR according to an embodiment of the present invention.

FIG. 7 is a diagram illustrating an example of the configuration of an uplink IMR according to an embodiment of the present invention.

Referring to FIG. 7, the diagram 700a indicates a control area or an area for a reference signal. The diagram 700b indicates an area where uplink interference is measured for a flexible duplex mode, that is, an uplink IMR area. The diagram 700c indicates a mute area where uplink transmission is muted.

UE 1 measures interference during a designated uplink IMR area in a UL subframe 705 of UE 1. In a UL subframe 710 of UE 2, UE 2 may interrupt uplink transmission in the same area as the uplink IMR area. Therefore, UE 1 may accurately measure only inter-cell interference, excluding the effect of intra-cell interference. UE 1 may receive DL data transmitted through a flexible DL mode in the same area as the uplink IMR area in a DL subframe 715.

The above-described scheme, which uses an uplink IMR, does not report an IR for a UL band but fixedly uses RI=1. Therefore, a spatial multiplexing mode may not be used. An uplink RI indicates a signal for reporting an RI for a UL band, as opposed to an RI for a DL band. A UE may feed an uplink RI signal to an eNB, whereby the spatial multiplexing mode may be used.

In an embodiment, when a UE operates in a transmission diversity mode, as opposed to the spatial multiplexing mode, the UE measures and reports CQI through an uplink IMR, and an uplink RI is fixed to 1.

When the UE desires to operate in the spatial multiplexing mode, the UE measures and reports CQI through an uplink IMR, measures an IR for a UL band, and reports the measured uplink RI to an eNB. The eNB operates the UE in spatial multiplexing mode based on the uplink RI.

Embodiments of the present invention for accurately measuring inter-cell interference are as follows.

1) A Scheme of Measuring in Disregard of Intra-Cell interference

The scheme may support a legacy UE by assuming that, when a UE measures inter-cell interference, there is a low probability of another UE in a cell performing uplink transmission at that point in time. However, if another UE in the cell performs uplink transmission, measured interference may be incorrect.

2) A Scheme of Interrupting UL Transmission of UE(s) which May Cause Inter-Cell Interference at a Time when Inter-Cell Interference is Measured An eNB forcibly mutes uplink transmission of some UEs, thereby removing intra-cell interference in a predetermined period of time. This scheme may also support legacy UEs, but the total throughput gain of a cell may deteriorate since uplink transmission is forcibly interrupted in order to perform interference measurement.

3) A Scheme of Measuring Interference Using an Uplink IMR

The present scheme may not support legacy UEs, but may accurately measure inter-cell interference excluding intra-cell interference.

Figure 8:
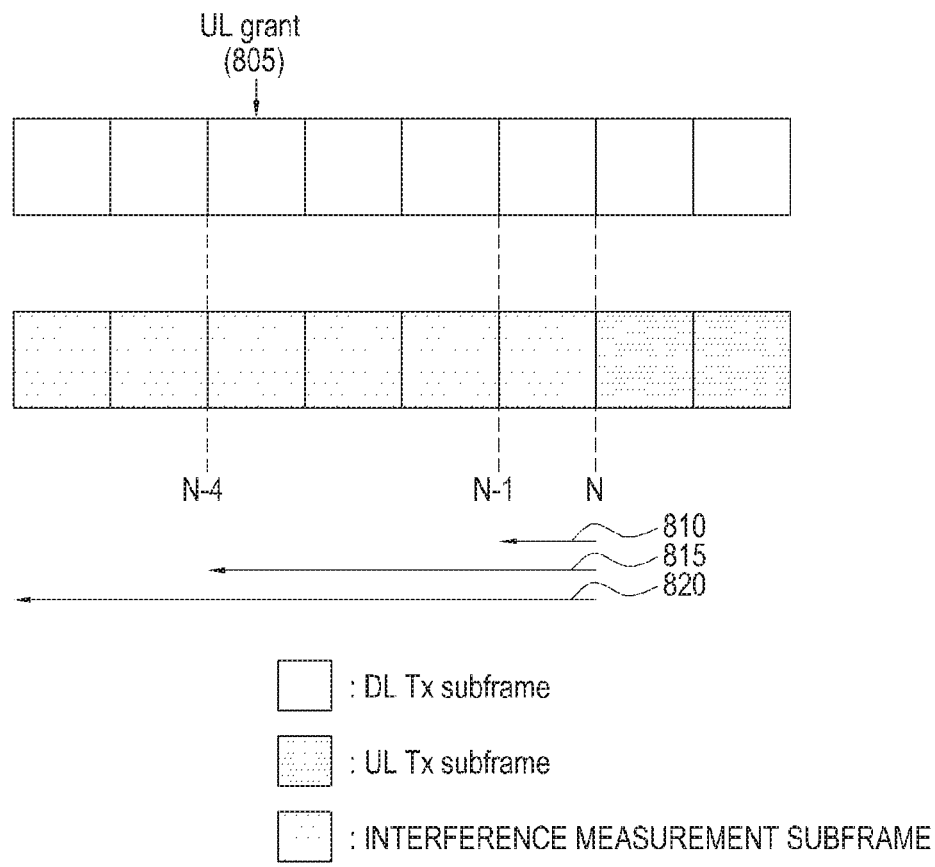
FIG. 8 is a diagram illustrating schemes of determining the length of UL subframes to be used for measuring interference according to an embodiment of the present invention.

FIG. 8 is a diagram illustrating schemes of determining the length of UL subframes to be used for measuring interference according to an embodiment of the present invention.

Referring to FIG. 8, when a UL grant that allocates UL transmission of an $N^{th}$ subframe is transmitted in an $N-4^{th}$ subframe 805, the length of UL subframes for measuring interference, which are included in an uplink IMR, may be determined through one of the following schemes.

Diagram 810 indicates a scheme of measuring interference only in an $N-1^{th}$ subframe. The scheme may most simply and readily measure interference, but a measured interference value may be incorrect compared with the case in which many subframes are used.

Diagram 820 indicates a scheme of measuring interference in an $N-1^{th}$ subframe and a previous subframe(s). That is, a UE may measure interference in a plurality of subframes in which UL transmission is not allocated. The scheme may improve the accuracy of an interference measurement value compared with the case where only a single subframe is used. However, energy may be consumed when a UE measures interference.

The reference 815 indicates a scheme of measuring interference from an $N-1^{th}$ subframe to an $N-a^{th}$ subframe. Here, a may be determined in advance as a positive integer greater than 1, or may be a value determined by an eNB. In the example, a=4.

When an eNB receives accurate CQI from a UE, the eNB may improve a throughput through the following operations.

In the case in which a UE is allowed to receive DL transmission through only a single band, an eNB transmits, to the UE, a DL signal using only a link of the one band having higher CQI among a DL band and a borrowed UL band. Compared CQIs may be obtained through the above mentioned Equation 1 and Equation 2. According to a situation, the eNB may perform DL transmission using only a DL band, or may select one band from among a DL band and a borrowed UL band and perform DL transmission through the selected band.

Figure 9A:
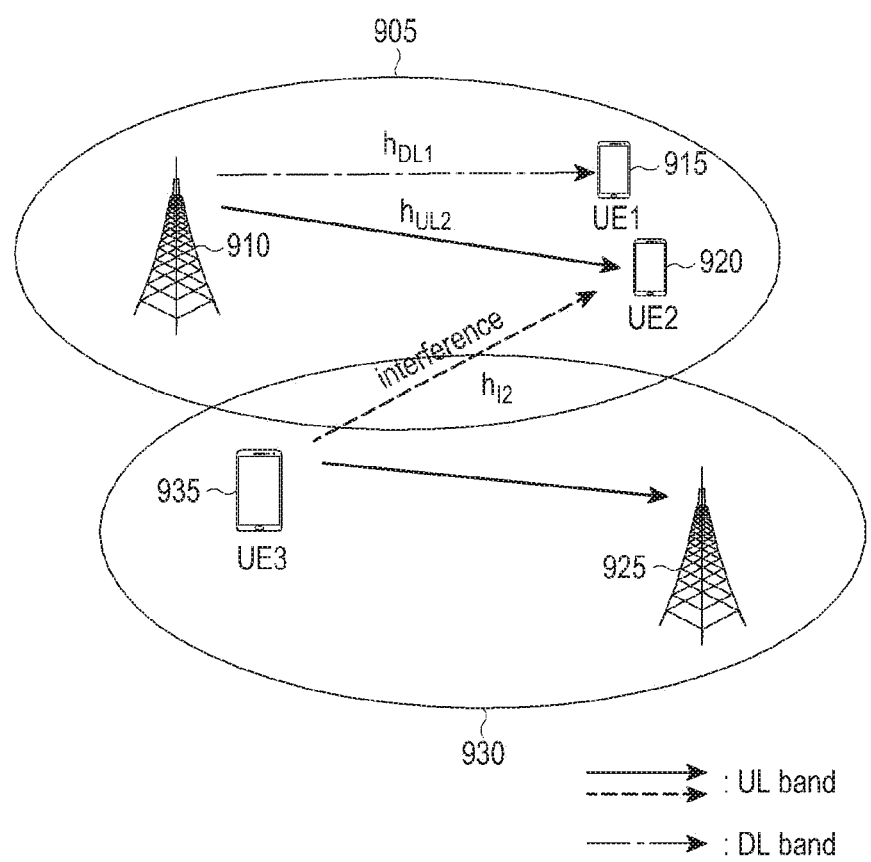
FIGS. 9A and 9B are diagrams illustrating multi-user support by a flexible duplex system according to an embodiment of the present invention.
Figure 9B:
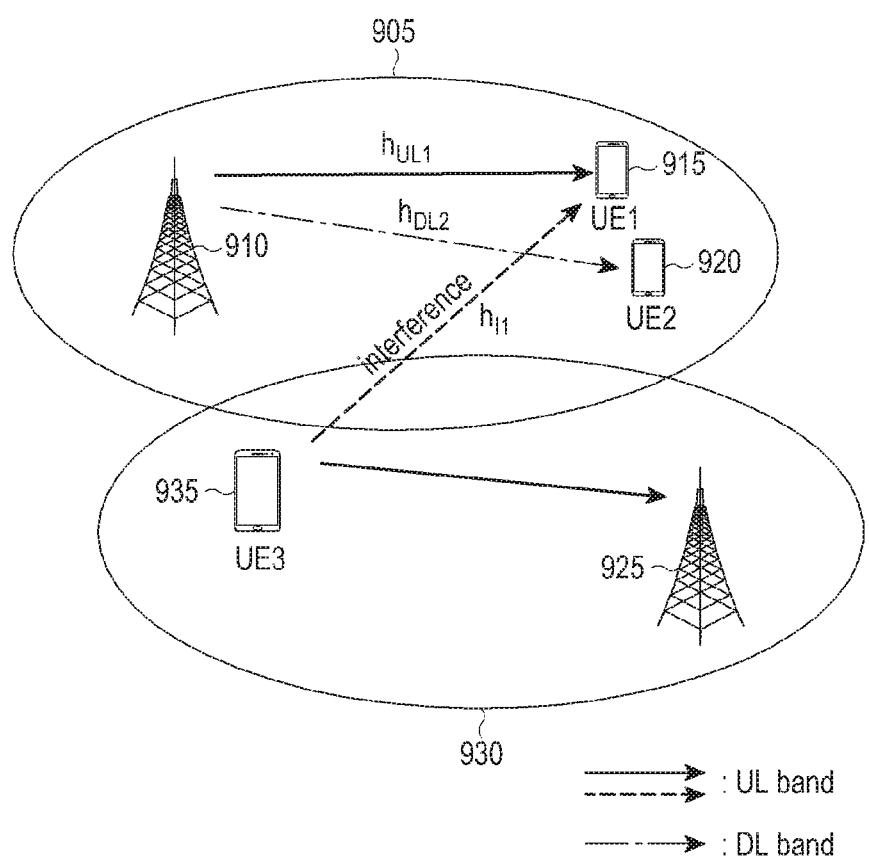

FIGS. 9A and 9B are diagrams illustrating multi-user support by a flexible duplex system according to an embodiment of the present invention.

Referring to FIGS. 9A and 9B, cell 1 905 is controlled by eNB 1 910, and UE 1 915 and UE 2 920 exist in cell 1 905. Cell 2 930, which is close to cell 1 905 and may partially overlap cell 1 905, is controlled by eNB 2 925, and UE 3 935 exists in cell 2 930 and may act as an interference source with respect to the UEs 915 and 920 in cell 1 905. Here, the UEs 915 and 920 may use only one band for DL reception at any point in time.

$CQI_{DL1}$ indicating CQI for a DL band of UE 1 915 and $CQI_{UL1}$ indicating CQI for a UL band are as shown in Equation 5 and Equation 6.

$$CQI_{DL1} = f\left(\frac{|w_{DL}h_{DL1}|^2}{N_0}\right) \quad \text{[Equation 5]}$$

$$CQI_{UL1} = f\left(\frac{|w_{UL}h_{UL1}|^2}{\|h_{I1}\|^2 + N_0}\right) \quad \text{[Equation 6]}$$

Here, $w_{DL1}$ denotes a precoder index applied to a DL band of UE 1 915, and $h_{DL1}$ denotes an estimated channel value of a DL band. $w_{UL1}$ denotes a precoder index applied to a UL band of UE 1 915, $h_{UL1}$ denotes the estimated channel value of a UL band, and $h_{I1}$ denotes the estimated value of inter-cell interference measured by UE 1 915.

$CQI_{DL2}$ indicating CQI for a DL band of UE 2 920 and $CQI_{UL2}$ indicating CQI for a UL band are as shown in Equation 7 and Equation 8.

$$CQI_{DL2} = f\left(\frac{|w_{DL2}h_{DL2}|^2}{N_0}\right) \quad \text{[Equation 7]}$$

$$CQI_{UL2} = f\left(\frac{|w_{UL2}h_{UL2}|^2}{\|h_{I2}\|^2 + N_0}\right) \quad \text{[Equation 8]}$$

Here, $w_{DL2}$ denotes a precoder index applied to a DL band of UE 2 920, and $h_{DL2}$ denotes an estimated channel value of a DL band. $w_{UL2}$ denotes a precoder index applied to a UL band of UE 2 920, $h_{UL2}$ denotes the estimated channel value of a UL band, and $h_{I2}$ denotes the estimated value of inter-cell interference measured by UE 2 920.

An eNB collects pieces of CQI fed back from UEs 915 and 920, selects a combination showing excellent performance among combinations of CQIs of UE 1 915 and CQIs of UE 2 920, and determines a band to be allocated to UE 1 915 and UE 2 920. When the combination of $CQI_{DL1}$ and $CQI_{UL2}$ shows the best performance, the eNB may select a DL band for UE 1 915 and a UL band for UE 2 920, as shown in FIG. 9A. As another example, when the combination of $CQI_{DL1}$ and $CQI_{UL2}$ shows the best performance, the eNB may select a UL band for UE 1 915 and a DL band for UE 2 920, as shown in FIG. 9B.

Figure 10:
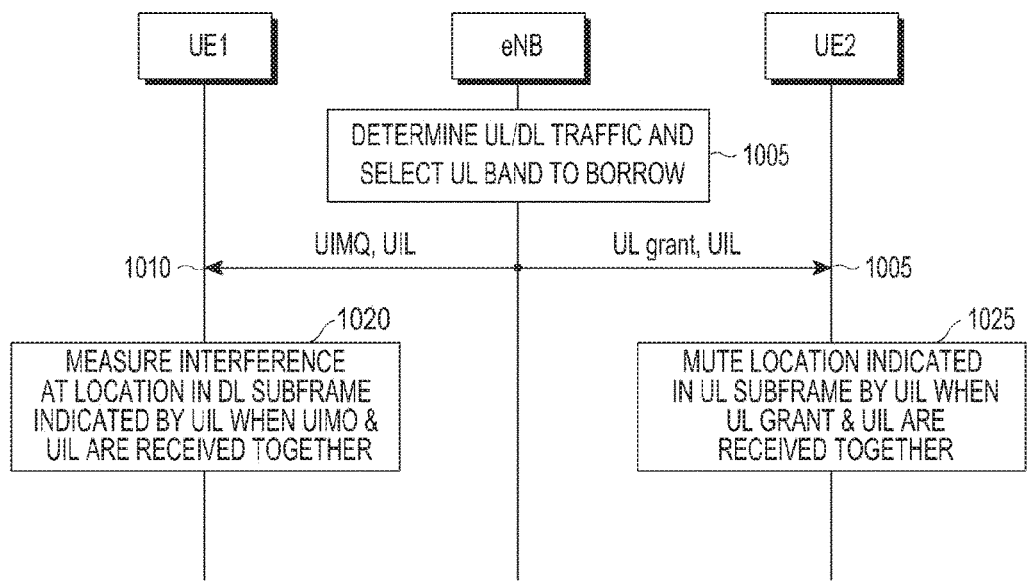
FIG. 10 is a signal flowchart illustrating an operation for configuring an uplink IMR according to an embodiment of the present invention.

FIG. 10 is a signal flowchart illustrating an operation for configuring an uplink IMR according to an embodiment of the present invention.

Referring to FIG. 10, in operation 1005, an eNB identifies UL traffic and DL traffic for UEs in a cell and selects the UL band to borrow. Particularly, the eNB requests UE 1 to measure interference, and determines to allocate UL transmission to UE 2. In operation 1010, the eNB transmits, to UE 1, a UIL signal indicating the location of an uplink IMR where interference is to be measured and a UIMQ for requesting interference measurement. In operation 1015, the eNB transmits, to UE 2, a UIL signal and a UL grant that allocates UL transmission.

In operation 1020, UE 1 detects that the UIMQ and the UIL are received, and measures interference in an area indicated by the UIL in a DL subframe. In operation 1025, UE 2 detects that the UL grant and the UIL are received, and mutes UL transmission in an area indicated by the UIL in a UL subframe.

Figure 11:
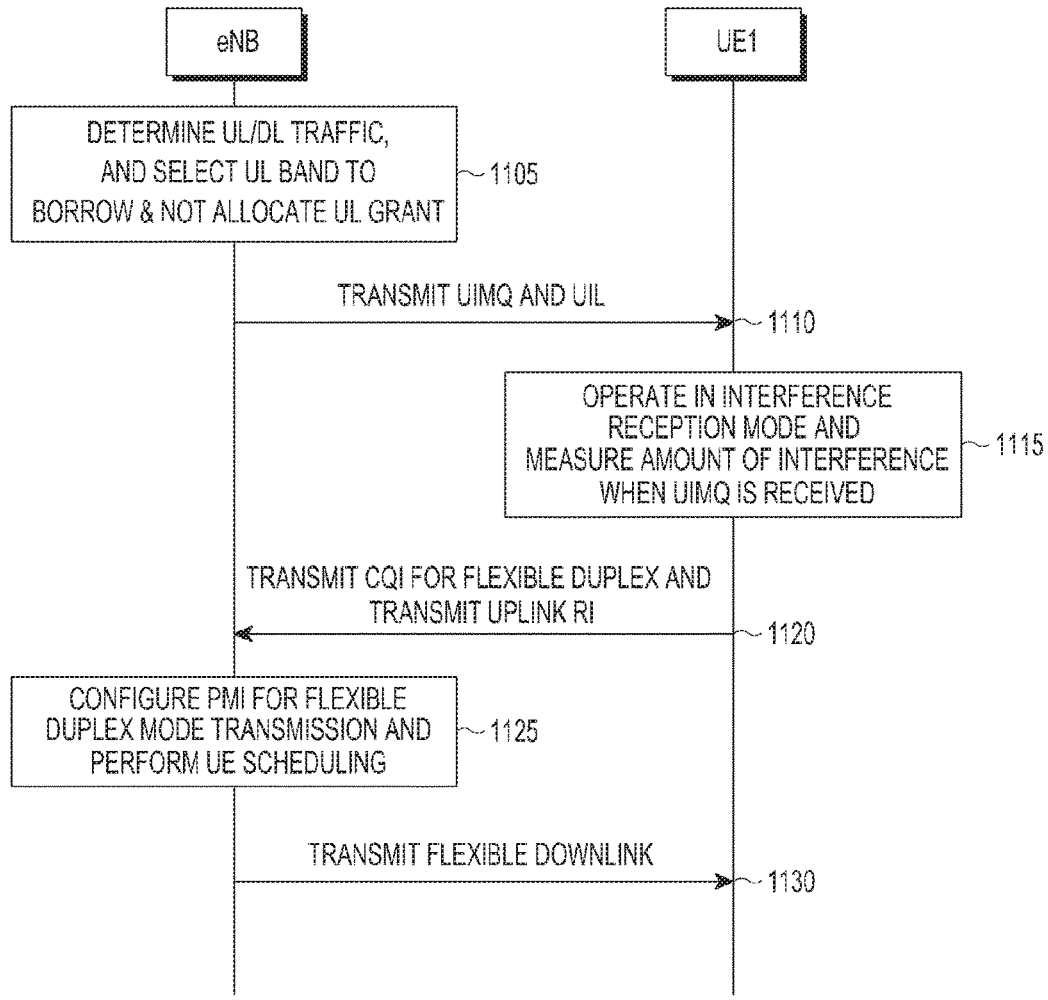
FIG. 11 is a signal flowchart illustrating a flexible DL transmission operation of an eNB and a UE according to an embodiment of the present invention.

FIG. 11 is a signal flowchart illustrating a flexible DL transmission operation of an eNB and a UE according to an embodiment of the present invention.

Referring to FIG. 11, in operation 1105, an eNB identifies UL traffic and DL traffic for UEs in a cell and selects a UL band to borrow. Particularly, the eNB determines not to allocate a UL grant to UE 1. In operation 1110, the eNB transmits, to UE 1, a UIMQ for requesting interference measurement and a UIL signal indicating the location of an uplink IMR at which interference is to be measured.

In operation 1115, UE 1 determines to operate in an interference reception mode in response to the reception of the UIMQ, and measures the amount of interference in an uplink IMR area indicated by the UIL signal. In operation 1120, UE 1 transmits CQI for flexible duplex, which is determined based on the amount of measured interference, and may also transmit an uplink RI.

In operation 1125, the eNB configures a PMI for flexible-duplex-mode transmission based on the CQI and the uplink RI received from UE 1, and schedules UE 1. In operation 1130, the eNB may perform flexible DL transmission through borrowed subframes of a UL band by applying the PMI.

The flexible duplex system which operates as described above may improve the whole transmission rate by satisfying the amount of DL traffic demanded by LTE-A, which is significantly high, and may enable measurement of CQI information and an RI for a UL band which is used for flexible DL transmission. Also, a UE measures inter-cell interference by itself, whereby interference may be accurately measured. An uplink IMR is used, whereby inter-cell interference may be measured by excluding intra-cell interference. The location of the uplink IMR may be designated by an eNB using an UIL. Also, the UE may periodically or aperiodically report the amount of measured interference.

Particular aspects of the present invention may be implemented as a computer-readable code in a computer-readable recording medium. The computer-readable recording medium is a predetermined data storage device which can store data which can be read by a computer system. Examples of the computer readable recording medium may include a Read-Only Memory (ROM), a Random Access Memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present invention may be easily interpreted by programmers skilled in the art which the present invention pertains to.

It will be understood that a method and apparatus according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be appreciated that the method according to various embodiments of the present invention may be implemented by a computer or portable terminal including a controller and a memory, wherein the memory is one example of machine-readable storage media suitable to store a program or programs including instructions for implementing the embodiments of the present invention.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, an apparatus according to various embodiments of the present invention may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The embodiments of the present invention disclosed herein and shown in the drawings are merely specific examples presented in order to easily describe technical details of the present invention and to help the understanding of the present invention, and are not intended to limit the scope of the present invention. Further, the embodiments of the present invention as described above are merely illustrative, and it will be understood by those skilled in the art that various modifications and equivalents thereof are possible within the scope of the present invention. Therefore, the true technical scope of protection of the present invention should be defined by the following appended claims.

The invention claimed is:

1. A method of measuring interference in a flexible duplex system, the method comprising:

determining whether a UL grant for allocating uplink (UL) transmission is received from a base station in a first subframe;
when the UL grant is not received, measuring inter-cell interference with respect to an uplink interference measurement resource (IMR) in at least one second subframe determined by the first subframe; and
when the UL grant is received, measuring inter-cell interference with respect to the uplink interference measurement resource (IMR) in at least one third subframe prior to a subframe indicated by the UL grant.

2. The method as claimed in claim 1, further comprising:
receiving, from the base station, a signal indicating a location of the uplink IMR of each subframe.

3. The method as claimed in claim 1, wherein the at least one second subframe includes at least one consecutive subframe which is subsequent to the first subframe by a predetermined offset.

4. The method as claimed in claim 1, wherein the measuring inter-cell interference in the second subframe comprises:
when a signal for requesting uplink interference measurement and a signal indicating a location of the uplink IMR of each subframe are received together in the first subframe, measuring the inter-cell interference in the at least one second subframe.

5. The method as claimed in claim 1, wherein, when the UL grant is received together with a signal indicating a location of the uplink IMR of each subframe, interrupting UL transmission in a subframe indicated by the UL grant.

6. The method as claimed in claim 1, wherein the at least one third subframe includes a predetermined number of subframes, includes a designated number of subframes designated by the base station, or includes subframes in which UL transmission is not allocated and which are subsequent to a subframe indicated by a previous UL grant.

7. The method as claimed in claim 1, further comprising:
determining a channel quality information (CQI) and an uplink rank indicator (RI) based on the measured inter-cell interference, and reporting the CQI and the RI to the base station; and
receiving a downlink (DL) signal transmitted based on the CQI and the RI from the base station in at least one predetermined subframe of an uplink band.

8. A method of supporting interference measurement by a user equipment (UE) in a flexible duplex system, the method comprising:
transmitting, to a first UE which is to measure inter-cell interference, a first signal for requesting uplink (UL) interference measurement and a second signal indicating a location of an uplink interference measurement resource of each subframe, during a first subframe;
transmitting, to at least one second UE which is different from the first UE, a UL grant for allocating uplink transmission and the second signal indicating the location of the uplink interference measurement resource, during the first subframe;
receiving, from the first UE, channel quality information (CQI) and an uplink rank indicator (RI) which are based on inter-cell interference measured in the uplink interference measurement resource; and
transmitting a downlink (DL) signal to the first UE according to the CQI and the RI in at least one predetermined subframe of an uplink band.

9. The method as claimed in claim 8, wherein the first signal and the second signal instruct the first UE to measure inter-cell interference with respect to an uplink interference measurement resource (IMR) in at least one second subframe determined by the first subframe.

10. The method as claimed in claim 9, wherein the at least one second subframe includes at least one consecutive subframe, which is subsequent to the first subframe by a predetermined offset.

11. The method as claimed in claim 8, wherein the UL grant and the second signal instruct the second UE to measure inter-cell interference with respect to the uplink interference measurement resource (IMR) in at least one third subframe prior to a subframe indicated by the UL grant.

12. The method as claimed in claim 11, wherein the at least one third subframe comprises a predetermined number of subframes, a designated number of subframes designated by a base station, or subframes in which UL transmission is not allocated and which are subsequent to a subframe indicated by a previous UL grant.

13. The method as claimed in claim 8, wherein the UL grant and the second signal instruct the second UE to interrupt UL transmission in a subframe indicated by the UL grant.

14. The method as claimed in claim 8, further comprising:
when it is determined that a UL grant for allocating uplink transmission needs to be transmitted to the first UE in the first subframe, delaying transmission of the UL grant for one subframe.

15. A user equipment (UE) device, which is configured to measure interference in a flexible duplex system, where the UE device comprises:
a transceiver; and
a controller configured to:
determine whether an uplink (UL) grant for allocating UL transmission is received from a base station in a first subframe;
when the UL grant is not received, measure inter-cell interference with respect to an uplink interference measurement resource (IMR) in at least one second subframe determined by the first subframe; and
when the UL grant is received, measure inter-cell interference with respect to the uplink interference measurement resource (IMR) in at least one third subframe prior to a subframe indicated by the UL grant.

16. A base station, which is configured to support interference measurement by a user equipment (UE) in a flexible duplex system, wherein the base station comprises:
a controller; and
a transceiver configured to:
transmit, to a first UE which is to measure inter-cell interference, a first signal for requesting uplink (UL) interference measurement and a second signal indicating a location of an uplink interference measurement resource of each subframe, during a first subframe;
transmit, to at least one second UE which is different from the first UE, a UL grant for allocating uplink transmission and the second signal indicating the location of the uplink interference measurement resource, during the first subframe;
receive, from the first UE, channel quality information (COI) and an uplink rank indicator (RI) which are based on inter-cell interference measured in the uplink interference measurement resource; and
transmit a downlink (DL) signal to the first UE according to the CQI and the RI in at least one predetermined subframe of an uplink band.

17. The UE device as claimed in claim 15, wherein the transceiver is configured to:
receive, from the base station, a signal indicating a location of the uplink IMR of each subframe.

18. The UE device as claimed in claim 15, wherein the at least one second subframe includes at least one consecutive subframe which is subsequent to the first subframe by a predetermined offset.

19. The base station apparatus as claimed in claim 16, wherein the first signal and the second signal instruct the first UE to measure inter-cell interference with respect to an uplink interference measurement resource (IMR) in at least one second subframe determined by the first subframe.

20. The base station apparatus as claimed in claim 19, wherein the at least one second subframe includes at least one consecutive subframe, which is subsequent to the first subframe by a predetermined offset.

* * * * *